(12) United States Patent
Brew et al.

(10) Patent No.: US 12,485,574 B2
(45) Date of Patent: Dec. 2, 2025

(54) EXTRUSION DIES WITH ZONED COATINGS, METHODS OF FABRICATING SUCH DIES, AND METHODS OF MANUFACTURING CERAMIC ARTICLES

(71) Applicant: CORNING INCORPORATED, Corning, NY (US)

(72) Inventors: Thomas William Brew, Corning, NY (US); Keith Norman Bubb, Beaver Dams, NY (US); Ryan Joseph Grohsmeyer, Addison, NY (US); Michael James Lehman, Canisteo, NY (US); Kenneth Charles Sariego, Beaver Dams, NY (US); Min Shen, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 170 days.

(21) Appl. No.: 18/032,085

(22) PCT Filed: Nov. 22, 2021

(86) PCT No.: PCT/US2021/060252
§ 371 (c)(1),
(2) Date: Apr. 14, 2023

(87) PCT Pub. No.: WO2022/115348
PCT Pub. Date: Jun. 2, 2022

(65) Prior Publication Data
US 2023/0398716 A1 Dec. 14, 2023

Related U.S. Application Data

(60) Provisional application No. 63/119,027, filed on Nov. 30, 2020.

(51) Int. Cl.
*B28B 3/26* (2006.01)
*B28B 3/20* (2006.01)

(52) U.S. Cl.
CPC ........ *B28B 3/269* (2013.01); *B28B 2003/203* (2013.01)

(58) Field of Classification Search
CPC . B28B 3/269; B28B 2003/203; B23P 15/243; B29C 48/11; B29C 48/3003
See application file for complete search history.

(56) References Cited

U.S. PATENT DOCUMENTS 6,006,512 A 12/1999 Schmid
6,080,348 A 6/2000 Shalkey
(Continued)

FOREIGN PATENT DOCUMENTS

| JP | 2002-018822 A | 1/2002 |
| JP | 2008-194938 A | 8/2008 |
| JP | 2013-184339 A | 9/2013 |

OTHER PUBLICATIONS

JP2013184339A—Machine Translation (Year: 2013).*
(Continued)

*Primary Examiner* — Yunju Kim

(57) ABSTRACT

An extrusion die (16) including a plurality of pins (38) having side surfaces defining an intersecting array of slots (30) extending axially into the die (16) from a discharge face (34) of the die (16). A plurality of feedholes (28) extend axially from an inlet face (32) of the die (16) opposite to the discharge face (34). The feedholes (28) connect with the slots (30) at intersections (35) within the die (16) to create a flow path from the inlet face (32) to the discharge face (34). A first coating (42) is on at least a portion of the feedholes (28) in a first zone (46) extending over a first axial length of the flow path. A second coating (44) that is different than the first coating (42) is on at least a portion of (Continued)

the side surfaces (37) of the pins (38) in a second zone (48) extending over a second axial length of the flow path. Methods of fabricating an extrusion die (16) and manufacturing a ceramic article (100), such as a honeycomb body, are also disclosed.

14 Claims, 4 Drawing Sheets

(56) References Cited

U.S. PATENT DOCUMENTS

| | | | |
|---|---|---|---|
| 6,299,813 | B1 | 10/2001 | Brew et al. |
| 7,601,194 | B2 | 10/2009 | Beall et al. |
| 9,796,108 | B2 | 10/2017 | Vaidyanathan |
| 2004/0052890 | A1* | 3/2004 | Yamada ............... B29C 48/11 425/467 |
| 2004/0076707 | A1* | 4/2004 | Matsumoto ............ B28B 3/26 205/183 |
| 2015/0083325 | A1 | 3/2015 | Kitamura et al. |
| 2015/0251347 | A1 | 9/2015 | Vasquez et al. |

OTHER PUBLICATIONS

International Search Report and Written Opinion of the International Searching Authority; PCT/US2021/060252; mailed on Mar. 7, 2022, 18 pages; European Patent Office.

* cited by examiner

EXTRUSION DIES WITH ZONED COATINGS, METHODS OF FABRICATING SUCH DIES, AND METHODS OF MANUFACTURING CERAMIC ARTICLES

This is a national stage application under 35 U.S.C. § 371 of International Application No. PCT/US2021/060252, filed on Nov. 22, 2021, which claims the benefit of priority under 35 U.S.C. § 119 of U.S. Provisional Application Ser. No. 63/119,027 filed on Nov. 30, 2020, the content of which is relied upon and incorporated herein by reference in their entireties.

BACKGROUND

1. Field

This disclosure relates to extrusion dies, and more particularly to extrusion dies having multiple coatings in different zones along the internal flow path through the extrusion die.

2. Technical Background

Extrusion dies are utilized in a variety of applications, such as shaping green honeycomb bodies from a ceramic-forming batch mixture in the manufacture of ceramic honeycomb bodies. Surfaces of the extrusion dies may be covered by a wear-resistant coating to assist in protecting the base structure of the extrusion die from abrasive materials in the extruded material.

SUMMARY

In some embodiments, an extrusion die comprises a plurality of pins comprising side surfaces defining an intersecting array of slots extending axially into the die from a discharge face of the die; a plurality of feedholes extending axially into the die from an inlet face of the die opposite to the discharge face, wherein the feedholes connect with the slots at intersections within the die to create a flow path from the inlet face to the discharge face; a first coating on at least a portion of the feedholes in a first zone extending over a first axial length of the flow path; and a second coating on at least a portion of the side surfaces of the pins in a second zone extending over a second axial length of the flow path, wherein the first coating is different than the second coating.

In some embodiments, the second coating has a wear-resistance that is greater than that of the first coating.

In some embodiments, the second coating has a hardness that is greater than that of the first coating.

In some embodiments, the second coating has a roughness that is greater than that of the first coating.

In some embodiments, the second coating comprises particles embedded in a matrix, and wherein the particles have a hardness that is greater than that of the first coating.

In some embodiments, the first coating comprise at least one of a nickel plating, a titanium nitride (TiN) coating, or a titanium carbonitride (TiCN) coating.

In some embodiments, the second coating comprises at least one of a particle-embedded nickel plating, a titanium carbonitride (TiCN) coating, or a boron-doped titanium carbonitride coating (B-TiCN).

In some embodiments, the first zone extends from the inlet face to cover at least a portion of the side surfaces of the pins.

In some embodiments, the second zone extends from the discharge face to cover at least a portion of the feedholes.

In some embodiments, the second zone extends over the intersections between the feedholes and the slots.

In some embodiments, the first zone extends over the intersections between the feedholes and the slots.

In some embodiments, the first zone transitions to the second zone at an overlap zone at which the first coating is applied over the second coating and a thickness of the first coating tapers in an axial direction toward the discharge face until only the second coating is present.

In some embodiments, the second zone transitions to the first zone at an overlap zone at which the second coating is applied over the first coating and a thickness of the second coating tapers in an axial direction toward the inlet face until only the first coating is present.

In some embodiments, the first coating is applied along an entire length of the flow path from the inlet face to the discharge face, and the second coating is applied over at least a portion of the first coating such that the second zone corresponds to the portion covered by the second coating and the first zone corresponds to a non-covered portion.

In some embodiments, the first coating has a thickness that is variable in an axial direction with a maximum thickness proximate to the inlet face and a minimum thickness proximate to the discharge face.

In some embodiments, the second coating is applied along an entire length of the flow path from the inlet face to the discharge face, and the first coating is applied over at least a portion of the second coating such that the first zone corresponds to the portion covered by the first coating and the second zone corresponds to a non-covered portion.

In some embodiments, second first coating has a thickness that is variable in an axial direction with a maximum thickness proximate to the discharge face and a minimum thickness proximate to the inlet face.

In some embodiments, the die comprises a plurality of separately coated components affixed together.

In some embodiments, the die comprises an inlet plate comprising at least an inlet portion of the feedholes that is coated by the first coating and a discharge plate comprising at least a downstream portion of the slots and the pins that is coated by the second coating.

In some embodiments, the die comprises one or more intermediate plates affixed between the inlet plate and the discharge plate, wherein when affixed together in to the die, the one or more intermediate plates comprise at least one of an upstream portion of the slots, an intermediate or downstream portion of the feedholes, and the intersections between the feedholes and the slots.

In some embodiments, the second zone comprises surfaces of the discharge face.

In some embodiments, the first zone comprises surfaces of the inlet face.

In some embodiments, surfaces of the discharge face, the inlet face, or both are uncoated.

In some embodiments, surfaces of the inlet face are coated by a same material as the second coating.

In some embodiments, the pins and the slots together define an asymmetric pattern in which adjacent pins have different dimensions.

In some embodiments, the pins comprise a first subset of pins and a second subset of pins, and wherein the a shape or size of each pin in the first subset of pins is different than that of each pin in the second subset of pins.

In some embodiments, the first coating has a crystal size that is smaller than that of the second coating.

In some embodiments, a method for fabricating an extrusion die comprises: applying a first coating to the extrusion die in a first zone extending over a first axial length of a flow path through the die; and applying a second coating to the extrusion die in a second zone extending over a second axial length of the flow path through the die, wherein the first coating is different than the second coating.

In some embodiments, the die comprises a plurality of feedholes extending axially into the die from an inlet face of the die and wherein the first zone extends over at least a portion of the feedholes.

In some embodiments, die comprises a plurality of pins comprising side surfaces that define an intersecting array of slots extending axially into the die from a discharge face of the die and wherein the second zone extends over at least a portion of the side surfaces of the pins.

In some embodiments, applying the first coating is performed before applying the second coating.

In some embodiments, applying the second coating is performed before applying the first coating.

In some embodiments, applying the first coating comprises variably applying the first coating such that the first coating has a first maximum thickness at a first side of the die and a first minimum thickness at a second side of the die opposite to the first side of the die; and wherein applying the second coating comprises variably applying the second coating such that the second coating has a second maximum thickness at the second side of the die and second minimum thickness at the first side of the die.

In some embodiments, applying the first coating comprises applying the first coating over at least a portion of the second coating.

In some embodiments, applying the second coating comprises applying the second coating over at least a portion of the first coating.

In some embodiments, the method comprises stripping a portion of the first coating before applying the second coating, or stripping a portion of the second coating before applying the first coating.

In some embodiments, the method further comprises masking one or more surfaces before applying the first coating or before applying the second coating to prevent the masked surfaces from being coated.

In some embodiments, applying the first coating and applying the second coating each comprises at least one process selected from the group of electroless plating, electrodeposition plating, physical vapor deposition, and chemical vapor deposition.

In some embodiments, a method of manufacturing a ceramic article, comprises: extruding a ceramic precursor-containing batch mixture through an extrusion die to shape the batch mixture into a green honeycomb body via a flow path that extends from an inlet face of the extrusion die to a discharge face of the extrusion die; wherein surfaces of the flow path in a first zone proximate to the inlet face comprise a first coating and surfaces of the flow path in a second zone proximate to the discharge face comprise a second coating that is different than the first coating.

In some embodiments, the first coating has a first roughness that is less rough than a second roughness of the second coating.

In some embodiments, a first value of wall drag as the batch mixture travels through the first zone is less than a second value of wall drag as the batch mixture travels through the second zone.

In some embodiments, the second value of wall drag is at least 20% greater than the first value of wall drag.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
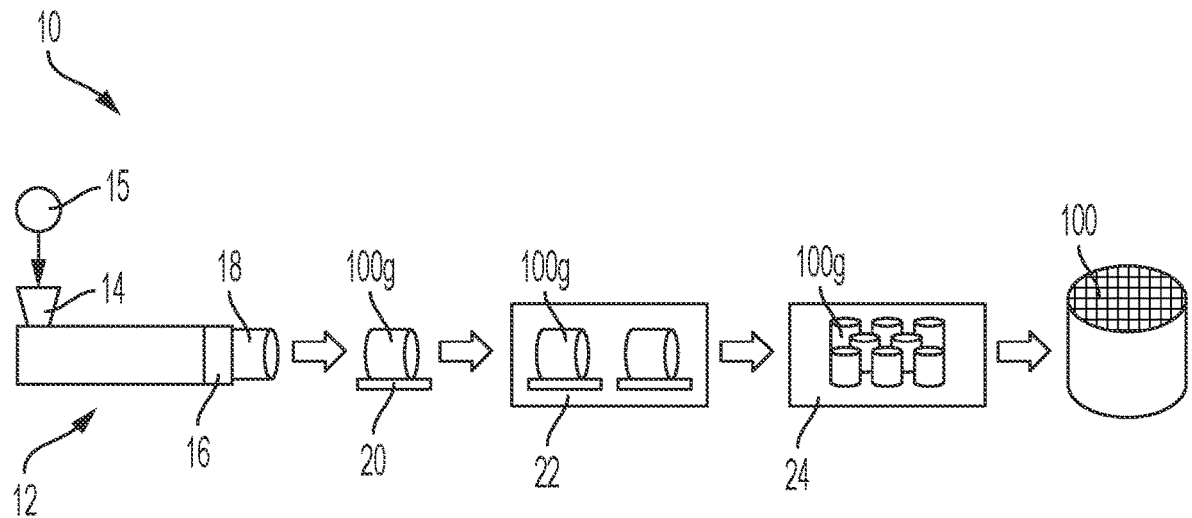
FIG. 1 is a schematic illustration a manufacturing system for the manufacture of ceramic articles according to one embodiment disclosed herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

The manufacture of ceramic honeycomb bodies, for example useful as particulate filters and catalyst substrates, can include shaping of a ceramic-forming mixture (alternatively, batch mixture) into a desired honeycomb shape through an extrusion die. The shaped green honeycomb body can be further processed, e.g., cut, dried, inspected, and fired to ultimately create the ceramic honeycomb bodies. The raw materials of the batch mixture, such as silica, clay, alumina, and other materials (such as other inorganic materials) may be abrasive or otherwise have an abrasive effect on the surfaces of the die during extrusion.

Wear resistant coatings (which, for ease of discussion herein generally include any suitable coating, deposition, or plating process) can be used to protect the base material (e.g., bare metal) of the die. While such coatings provide wear resistance to the die, the coatings may also affect other die performance and/or flow characteristics during extrusion through the die. For example, as described further herein, the properties of the coating may also affect the flow resistance or friction with the components of the batch mixture (which may be alternatively referred to as wall drag), the extrusion pressure (pressure required to extrude the batch mixture at a given rate, which may alternatively be referred to as the die pressure), the level of knitting of the material when forming features of the extrudate (e.g., intermixing of the extruded material at intersections between walls of a honeycomb structure), the spreading of the material of the batch mixture throughout the entire extrusion die (e.g., extruding without breaks or voids in the structure of the extrudate), and flow uniformity (e.g., uniform extrusion velocity across the discharge face of the die to prevent bow in the extrudate, warped walls, or other defects), among others.

According to various embodiments described herein, select zones along the flow path through the extrusion die (in the axial direction from the inlet face to the discharge face of the die) are provided with different coatings to provide wear resistance to the die while promoting desired or targeted flow characteristics. For example, a first coating having high wear-resistant properties (e.g., a nickel-diamond plating) can be arranged on the pins of the extrusion die, or otherwise proximate to the discharge face of the die, with a second coating having relatively low friction and thereby reduced flow resistance (e.g., pure nickel) in the feedholes, or otherwise proximate to the inlet face of the die, which facilitates a comparatively lower die pressure.

Advantages of the embodiments disclosed herein include longer usage life of the die before the die needs to be recoated due to use of the high wear-resistant materials in high-wear locations along the flow path. Additional advantages include increased knitting, spreading, and/or flow uniformity (uniform flow velocity across the discharge face of the die at any given time) of the batch mixture during extrusion due to selective placement of high roughness (corresponding to high flow resistance) materials proximate to the discharge face, which results in fewer defects in the extruded green bodies and ceramic articles made therefrom. Further, selective placement of high roughness coatings enables the use of shorter pin lengths (and correspondingly shorter slot depths), which promotes easier die cleaning between runs due to reduced resistance of the shorter pins to water infiltration, lower pin root stress due to lower bending moment from the shorter pin length, and correspondingly less pin splay or permanent deformation due, and lower die fabrication costs as slot-forming is a time consuming process and the depth of the slots is reduced proportionally to the reduction in pin length.

Referring to FIG. 1, a manufacturing system 10 is illustrated for manufacturing ceramic articles 100, an example of which is illustrated in FIG. 1 as a ceramic honeycomb body. For example, a ceramic honeycomb body can comprise a plurality of intersecting walls of a ceramic material, e.g. porous ceramic material, which define channels extending longitudinally (axially) between opposite end faces of the honeycomb body. The ceramic material can comprise any known or discovered suitable ceramic composition, such as cordierite, mullite, aluminum titanate, or silicon carbide, among others, including combinations thereof.

The manufacturing system 10 comprises an extruder 12 that comprises an inlet 14, such as a hopper, for receiving a mixture 15 of ceramic precursors (e.g., combination of one or more ceramic and/or ceramic-forming materials that create the phase(s) of the ceramic article 100 via chemical reaction and/or sintering), which may be referred to herein as the batch mixture 15. The extruder 12 can comprise one or more rotatable screws, a ram, or other mechanism for mixing and/or pressurizing the batch mixture 15 within the body of the extruder 12.

The extruder 12 comprises an extrusion die 16 through which the pressurized batch mixture 15 is forced. For example, the extrusion die 16 can comprise a plurality of slots in an intersecting array through which an extrudate 18 is extruded. In this way, the slots can be arranged in a honeycomb pattern, to define a honeycomb structure for the ceramic article 100. Lengths of the extrudate 18 can be cut off (e.g., via a blade, saw, vibratory cutter, laser, wire, or other cutting device) to form one or more green bodies 100g. The green bodies 100g can be placed on a tray, belt, sheet, conveyor, or other transport mechanism 20 or combination of transport mechanisms for transportation to subsequent manufacturing steps. The green bodies 100g can be dried in a dryer 22 to remove water or other liquid carrier present, e.g., using elevated temperature, air flow, microwaves, or other form of drying. After drying, the dry green bodies 100g can be transported to a kiln 24 in which the green bodies 100g are fired. The firing process can be used to convert the green bodies 100g into the ceramic articles 100, such as by reaction and/or sintering of ceramic and/or ceramic-forming materials in the green bodies 100g.

As noted above, the batch mixture 15 can comprise one or more ceramic precursors (ceramic and/or ceramic-forming materials), which result in one or more ceramic phases of the ceramic article 100 as a result of firing. Example ceramic precursors in the batch mixture 15 include clay, talc, alumina, titania, silica, and other oxides, including particles of the desired ceramic phase or phases, such as cordierite, mullite, or aluminum titanate particles. The batch mixture 15 can further comprise an organic binder such as methylcellulose (e.g., to enable extrudability in the desired shape of the green body 100g and maintain green strength during subsequent manufacturing steps), pore formers such starches, polymers, and graphite, (e.g., materials that are burned off or otherwise react at firing temperatures to form or leave voids in the resulting ceramic material), extrusion aids such as lubricants or oils (e.g., to reduce extrusion pressure, reduce friction of abrasive particles in the batch mixture 15, and/or impart a desired rheology to the batch mixture 15), sintering aids to assist in the sintering together of ceramic components during firing (e.g., to increase strength of the ceramic article 100 after firing), and a liquid carrier such as water (e.g., to enhance mixability and extrudability of the batch mixture 15).

Figure 2:
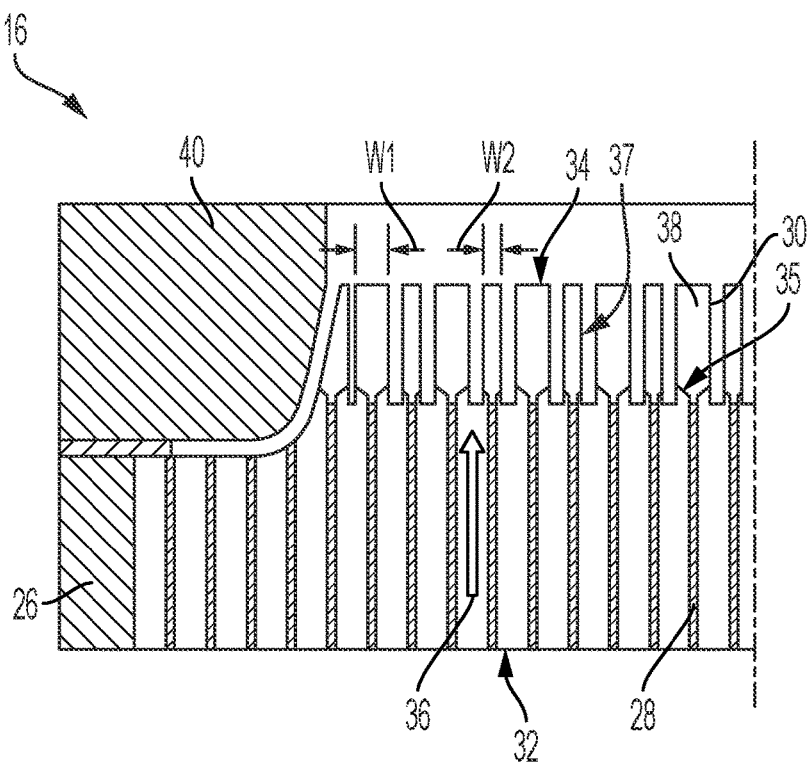
FIG. 2 is a cross-sectional view of a portion of an extrusion die according to one embodiment disclosed herein.

FIG. 2 illustrates a portion of the extrusion die 16 in cross-section according to one embodiment. In the illustrated embodiment, the extrusion die 16 comprises a die body 26 into which a plurality of feedholes 28 and a plurality of slots 30 are formed. The feedholes 28 extend axially into the die body 26 from an inlet face 32 of the die 16, while the slots 30 extend axially into the die body 26 from a discharge face 34 of the die 16, which is opposite to the inlet face 32. The feedholes 28 and the slots 30 connect at connections or intersections 35 within the die body 26 to create a flow path (e.g., for the batch material 15) extending axially through the die 16 from the inlet face 32 to the discharge face 34 via the feedholes 28, the connections 35, and the slots 30. The axial direction of the flow path can be appreciated with respect to an arrow 36 in FIG. 2, which thereby also designates the extrusion direction of material through the die 16.

The slots 30 are defined between side surfaces 37 of a plurality of pins 38, which extend axially to the discharge face 34. The pins 38 can be integrally formed from the same monolithic base structure as the die body 26 or otherwise affixed to die body 26. The slots 30 and pins 34 are arranged to provide a desired pattern for the extrudate (e.g., a honeycomb pattern). For example, when arranged as a honeycomb extrusion die, the slots 30 permit the passage of batch material to define the intersecting walls of the extruded honeycomb structure and corresponding structural features of the walls (e.g., shape, orientation, and thickness), while the pins 38 define the axially-extending channels of the honeycomb structure and the corresponding structural features of the channels (e.g., orientation and cross-sectional size and shape).

The pins 38 in the embodiment of FIG. 2 are illustrated as having two different cross-sectional sizes (described in more detail below), however, the extrusion die 16 can alternatively have pins that are all the same size, or of any number of different sizes. Similarly, the slots 30 can all have the same slot width (defining the thickness of the extruded honeycomb structure) or different slot widths at different locations of the die 16. The pins 38 can have any suitable cross-sectional shape (or multiple different shapes at different locations of the die), such as rectangle, square, triangle, octagonal, polygonal, circular, ellipsoidal, or other shape, which define the corresponding shape(s) of channels in the ceramic article 100. The extrusion die 16 can optionally comprise a skin-forming ring or mask 40 to assist in creating an outer skin about the periphery of the honeycomb extrudate. The outer periphery of the extrudate can have any suitable cross-sectional shape, such as circular, ellipsoidal, rectangular, etc., to create the green bodies 100g and ceramic articles 100 as cylinders, prisms, etc.

During extrusion, the batch mixture 15 is received at the inlet face 32, forced through the feedholes 28 to the connections 35 with the slots 30, and then shaped by the slots 30 and discharged at the discharge face 32 in the pattern (e.g., honeycomb structure) set by the slots 30. As described further herein, various axial lengths of the feedholes 28 and/or the side surfaces 37 of the pins 38, which define the flow path through the die 16, are coated by different coatings (at least first and second coatings), which each comprise a different material composition in order to impart correspondingly different die performance and/or flow characteristics at different locations along the flow path.

Figure 3:
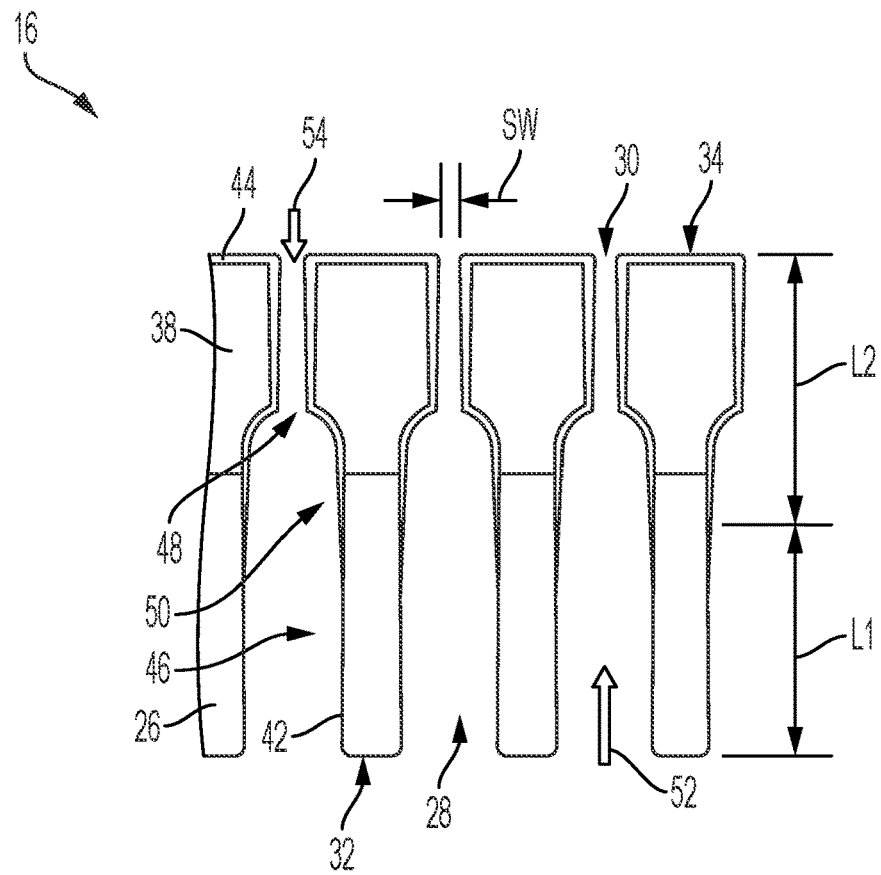
FIG. 3 is a cross-sectional view of a portion of an extrusion die comprising a first coating over a first zone and a second coating over a second zone according to one embodiment disclosed herein.
Figure 4:
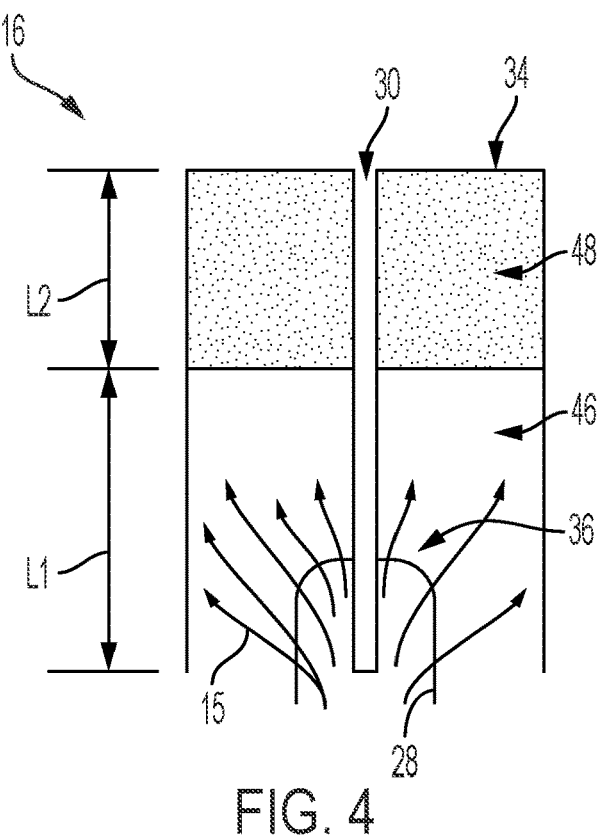
FIG. 4 is a cross-sectional view of a portion of an extrusion die comprising a first coating over a first zone and a second coating over a second zone according to one embodiment disclosed herein.

FIGS. 3-4 illustrate a portion of the extrusion die 16 according to some embodiments disclosed herein. In each of the embodiments of FIGS. 3 and 4, the die 16 comprises a first coating 42 (shown in a relatively lighter coloring) in a first zone 46 over a first axial length L1 along the flow path through the die 16, and a second coating 44 (shown in a relatively darker or shaded coloring) in a second zone 48 over a second axial length L2 along the flow path.

In the illustrated embodiments of FIGS. 3-4, the first zone 46 and the first axial length L1 extend axially from the inlet face 32 over at least a portion of the surfaces of the feedholes 28, while the second zone 48 and the second axial length L2 extend axially from the discharge face 34 over at least a portion of the side surfaces 37 of the pins 38. The first coating 42 and second coating 44 can coat the surfaces of the inlet face 32 and the discharge face 34, respectively, if desired, or these faces can have a different coating or no coating.

As described further herein, the axial lengths L1 and L2 can be set so as to transition from the first coating 42 of the first zone 46 to the second coating 44 of the second zone 48 at any desired location along the flow path through the die 16. For example, as shown in FIG. 3, the lengths L1 and L2 are set such that the second zone 48 extends completely over the length of the pins 38 to cover at least a portion of the feedholes 28, and thereby the connections 35 between the feedholes 28 and the slots 30, while the lengths L1 and L2 in FIG. 4 are set such that feedholes 28 are completely covered by the first coating 42 and the first zone 46 extends over at least a portion of the pins 38, and thereby also over the connections 35.

According to embodiments described herein, the first coating 42 and the second coating 44 comprise different materials. In this way, different die performance and/or flow characteristics can be achieved at different locations along the flow path within the die. For example, in some embodiments, the first coating 42 has a first roughness that is smoother than a second roughness of the second coating. In some embodiments, the second coating 44 is harder and/or more wear-resistant than the first coating 42. In some embodiments, the material of the second coating 44 is both more wear-resistant and rougher than the material of the first coating 42. For example, wear-resistance or abrasion-resistance can be determined experimentally by comparing the rate that various coatings are abraded or worn away under a given set of extrusions conditions. Alternatively, the hardness of the material of the coating can be used as an analog to approximate the wear-resistance, with high hardness coatings generally corresponding to better wear-resistance.

Specific examples of coatings include a pure nickel (Ni) plating, a nickel plating having embedded diamond particles, which may be referred to as a nickel-diamond (NiD) plating, titanium nitride (TiN), titanium carbonitride (TiCN), and boron-doped titanium carbonitride (B-TiCN), although any other suitable coating known or discovered in the art can be used. For example, in some embodiments, the first coating 42 is applied as a pure nickel plating, while the second coating 44 is applied a NiD plating. In some embodiments, a TiCN coating can be used as the first coating 42 and/or the second coating 44. For example, the first coating 42 can be applied as a TiCN coating and the second coating 44 applied as a B-TiCN coating. In some embodiments, the first coating 42 is applied as nickel plating and the second coating 44 is applied a TiCN coating.

In some embodiments, the roughness is selected to achieve a target wall drag that results from the combination of the roughness with the selected batch mixture. Those of ordinary skill in the ceramic extrusion arts will recognize wall drag as a complex variable that is measured in units of pressure per unit area, such as pascals per square inch, and that is able to experimentally ascertained. Values for wall drag for extrusion of ceramic-forming batch mixtures through honeycomb extrusions dies (having geometries suitable for manufacturing ceramic honeycomb bodies intended for use as catalyst substrates and/or particulate filters) may be in the range of about 1 to 2 pascals per square inch. Since roughness is only one variable that affects the wall drag (the amounts and types of raw materials in the batch mixture also affecting wall drag), the surface roughness that yields a given wall drag can vary depending on the batch mixture used. However, in general, higher roughnesses are generally correlated with greater wall drag values for any given batch mixture. Accordingly, in some embodiments, the first roughness and the second roughness are selected such that the resulting wall drag (e.g., measured in units of pascals per square inch) of the batch mixture through the second zone 48 is at least 20% more than the wall drag of that same batch mixture through the first zone 46.

Since the extrusion pressure depends on the wall drag multiplied by the surface area of the flow path, the total extrusion pressure can be reduced to acceptable levels by reducing the length of the coated surfaces along the flow path. For example, as described herein, the relatively high roughness at the second zone 48 can be utilized in this manner to correspondingly increase the wall drag through the second zone 48, thereby enabling a sufficient knitting pressure to be achieved even if the length of the pins in the second 48 is reduced (relative to a die having smoother surfaces, and therefore, lower wall drag).

In some embodiments, the material of the first coating 42 and the second coating 44 have the same chemical composition, but differs with respect to the size of the crystals of the materials used. For example, the first coating 42 can comprise a first TiCN coating having a first crystal size, while the second coating 44 comprises a second TiCN coating having a second crystal size that is larger than the first crystal size, which results in a relatively greater roughness for the second TiCN coating. In some embodiments, the first crystal size is less than or equal to 5 µm, while the second crystal size is greater than 5 µm. For example, the first crystal size can be at most about 5 µm, at most about 4 µm, at most about 3 µm, or preferably, at most about 2 µm, or even at most about 1 µm, including ranges including these values as endpoints, such as from 0 µm to 1 µm, from 0 µm to 2 µm, from 1 µm to 2 µm, from 1 µm to 3 µm, from 1 µm to 4 µm, or from 1 µm to 5 µm. The second crystal size in some embodiments is at least 5 µm, at least 8 µm, at least 10 µm, such as up to 15 um, including ranges having these values as endpoints, such as from 10 µm to 15 µm, from 5 µm to 10 µm, or from 5 µm to 15 µm. Crystal sizes provided herein can be verified via scanning electron microscopy.

The crystal size can be achieved in any suitable manner, such as by periodically interpreting the coating process during formation of the first and/or second coatings and/or altering the length of time each coating process is carried out. That is, interruption of many coating processes, such as CVD, will result in growth of the crystals to stop, such that new crystals will start to grow when the coating process is resumed. In contrast, crystals may undergo continuous growth when the coating process is uninterrupted, thereby resulting in larger crystals in comparison to an interrupted process. Accordingly, to create a smaller crystal size for the first coating, the first coating process can be temporarily halted, paused, or otherwise stopped or delayed at least once during the first coating process, while the second coating process is interrupted a fewer number of times, such as performed as a single uninterpreted coating process. Since the size of the crystals generally corresponds to the length of time the coating process is performed, larger crystals can alternatively or additionally be created by creating thicker coatings over a longer period of time.

In some embodiments, the first coating 42 is deposited, plated, covered, coated, or otherwise applied in a first coating process and the second coating 44 is deposited, plated, covered, coated, or otherwise applied in a second coating process. The first coating process can be performed before the second coating process, or the second coating process can be performed before the first coating process. The first coating process and second coating process can comprise any combination of suitable coating processes, such as chemical vapor deposition (CVD), physical vapor deposition (PVD), electroless plating, electrodeposition plating, electrostatic powder coating, ion implantation (e.g., boronization), thermal spray, welding, carburization, and nitriding, among others. In some embodiments, the first and second coating processes are the same (e.g., both are chemical vapor deposition processes), while in other embodiments the first and second coating processes are different (e.g., one coating process is a chemical vapor deposition process and the other coating process is a plating process).

In some embodiments, the die 16 comprises a plurality of separate components that are affixed together. By fabricating the die 16 from multiple separate components, each of the individual components can be separately coated with different coatings, e.g., via multiple different coating processes, and then affixed together. Accordingly, such embodiments may be particularly advantageous in setting the location of the zones 46 and 48, as the lengths L1 and L2 of the zones correspond to the axial dimension of separate components. For example, a first plate (e.g., comprising the inlet surface 32 and the feedholes 28) can be coated in a first coating process to set the first zone 46 as corresponding to the surfaces and the axial dimension of the first plate, and a second plate (e.g., comprising the discharge surface 34, the pins 38, and the slots 30) can be coated in a second coating process to set the second zone 48 as corresponding to the surfaces and the axial dimension of the second plate. One example of such an arrangement is illustrated in FIG. 5.

Figure 5:
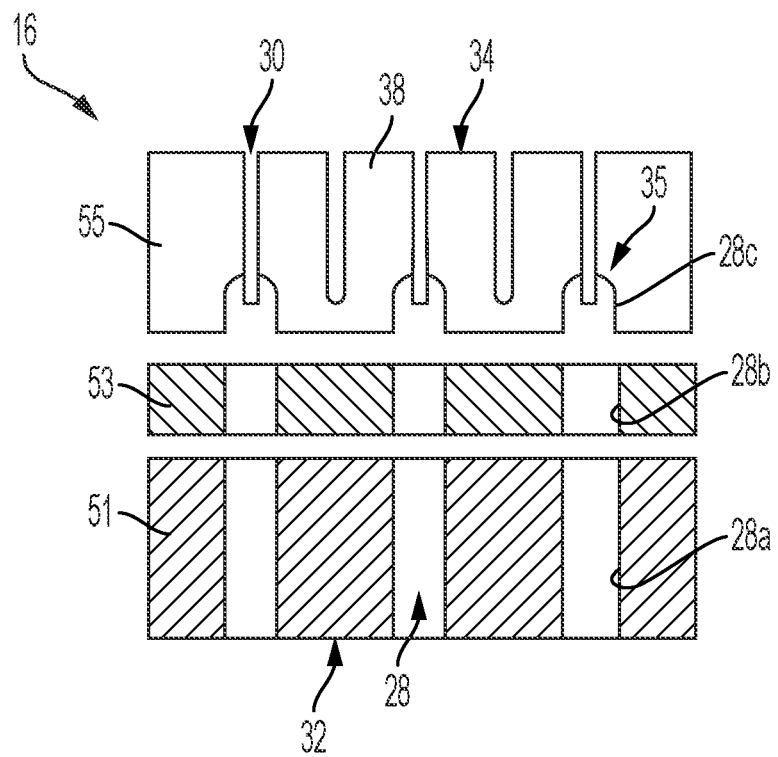
FIG. 5 is a cross-sectional view of a portion of an extrusion die comprising multiple discrete components that can be separately coated according to one embodiment disclosed herein.

In the embodiment of FIG. 5, the inlet face 32 is comprised by a first plate 51, which may alternatively be considered to be an inlet plate or a feedhole plate, and in which are formed at least an inlet portion 28a of the feedholes 28. The die 16 can comprise one or more intermediate plates 53 through which at least an intermediate portion 28b of the feedholes 28 are formed. In some embodiments, there are no intermediate plates 53, or multiple intermediate plates 53. In the embodiment of FIG. 5, the pins 38 are part of a discharge plate 55, into which the slots 30 are also formed. Accordingly, the discharge plate 55 forms the discharge face 34 for the die 16 when the plates are assembled together.

A downstream portion 28c of the feedholes 28 can be formed in the discharge plate 55 in order to form the connections 35 between the feedholes 28 and the slots 30. In order to form the slots 30 while still integrally connecting the pins 38 as part of the discharge plate 55, the roots of the pins 38 can be connected together each at sections where the slots 30 and the feedholes 28 do not intersect, as shown. In some embodiments, the intermediate plates 53 can comprise portions of the slots 30 in addition to the portions 28b of the feedholes 28, and therefore also comprise the connections 35. In some embodiments, the pins 38 are each discrete features that are separately and individually affixed to the discharge plate 55, the intermediate plate 53 (e.g., if there is no discharge plate 55), or the inlet plate 51 (if there is no discharge plate 55 and no intermediate plate 53).

For example, the first coating 42, comprising a relatively smoother material, e.g., a pure nickel coating, can be applied only to the inlet plate 51 via a first coating process, while the second coating 44, comprising a relatively rougher and/or abrasion-resistant material, e.g., NiD, can be applied only to the discharge plate 55 and/or only to the pins 38 via a second coating process. The intermediate plate(s) 53 can be separately coated in any number of additional separate coating processes. After each of the plates or other components (e.g., pins 38) are separately coated, the multiple coated components can be assembled together to form the die 16. The pins 38, inlet plate 51, intermediate plate(s) 53, and/or discharge plate 55 can be affixed to each other and/or the other listed components in any suitable manner, such as via brazing or mechanical clamps or fasteners. To facilitate affixation of the various components, the surfaces of the components that are to be affixed together can be masked during the respective coating processes, e.g., with a removable sheet or material, or any applied coating material can be stripped or removed, as described herein.

Coatings having high-hardness particles (e.g., diamond particles, carbide particles, etc.) dispersed through and embedded in a matrix (such as a nickel plating) may be particularly advantageous in embodiments in which it is desirable for the second coating 44 to maintain a high roughness even after being abraded by the batch mixture 15. For example, some coatings such as TiCN may be eventually worn smooth by the abrasive components of the batch mixture 15, which correspondingly reduces the roughness of the coating and thereby alters the flow resistance of the die 16 over time. Thus, even if the wear-resistant coating is still present (hasn't been fully abraded away), the die 16 may exhibit insufficient knitting, spreading, and/or flow uniformity as the coating is abraded.

Figure 6:
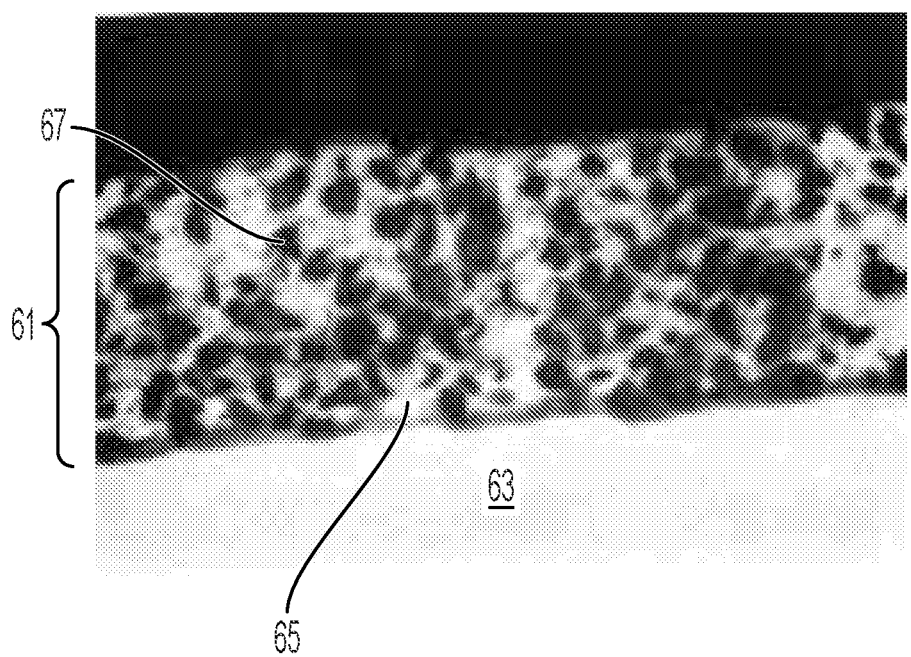
FIG. 6 is a cross-sectional view of a coating having particles of a high-hardness material embedded in a matrix according to one embodiment disclosed herein.

In contrast, FIG. 6 shows a cross-section of a nickel-diamond coating 61 on a body 63 (e.g., a portion of the extrusion die 16), with the coating 61 comprising a nickel matrix 65 (lighter color) and embedded diamond particles 67 (darker color). Since the embedded particles are dispersed throughout the entire thickness of the coating, the NiD coating (and other embedded-particle coatings) maintains its surface characteristics (roughness) throughout the entire wear cycle due to new diamond particles being exposed as the nickel matrix wears away. Accordingly, the continual replenishment of hard particles at the coating surface maintains the roughness, and therefore corresponding flow resistance (wall drag) throughout the life of these coatings.

In some embodiments, the feedholes 28 are plated with pure nickel then the connections 35 and the slots 30 are plated with a NiD plating. In some embodiments, the ends of the pins 38 defining the slots 30 proximate to the discharge face 34 are plated with NiD (e.g., only the last 0.50" to 0.10" of the pins 38) then the rest of the die 16 is plated with pure nickel. In some embodiments, the entirety of the die 16 is coated via CVD with TiN, TiCN, and/or B-TiCN, then a NiD plating is applied over the discharge face 34, the side surfaces of the pins 38 defining the walls of the slots 30, and/or the connections 35 of the die 16. Other pairings of different material compositions for the first coating 42 and second coating 44 are also possible in accordance with the embodiments described herein.

Many high wear resistance materials (e.g., NiD plating) have correspondingly high roughnesses. Since the high roughness corresponds to greater flow resistance, the use of these high roughness materials throughout a die may yield undesirably high die extrusion pressures. However, the current inventors have found that the use of both the first coating 42 and the second coating 44 at selected locations and along axial lengths (L1 and L2) of the corresponding first zone 46 and second zone 48, can be advantageously useful to enable the use of high wear-resistance materials while maintaining acceptably low die pressure. Accordingly, in some embodiments, the second coating 44 comprising a relatively harder and/or wear-resistant material is located in areas of the flow path that experience relatively higher wear, such as at the restricted flow path through the relatively thinner slots 30 and/or at the connections 35 between the feedholes 28 and the slots 30, while the first coating 42, comprising a relatively softer and/or smoother material, is positioned at locations experiencing relatively lower levels of wear, such as in the feedholes 28. In this way, locations along the flow path that are prone to high levels of wear (e.g., the surfaces 37 of the pins 38, which define the slots 30) are protected by the relatively harder and/or wear-resistant material of the second coating 44, while the relatively smoother, less flow-resistant material of the first coating 42 is arranged at locations of relatively less wear (e.g., along the lengths of the feedholes 28) to achieve an overall lower die pressure for extruding any given batch mixture 15 through the die 16.

In some embodiments, the arrangement of the second coating 44 proximate to the discharge face 34 of the die 16 as a relatively high roughness material can be useful to increase the localized flow resistance prior to the batch material 15 being extruded from the discharge face 34. For example, the roughness of the material generally corresponds to the flow resistance, and therefore increasingly higher roughness can be used to increase the localized flow resistance to, in turn, increase the knitting, spreading, and/or flow uniformity of the batch material 15 before the material is discharged from the die 16 at the discharge face 34. Accordingly, the roughness of the second coating 44 can advantageously be useful for controlling the flow characteristics through the die 16, thereby enabling the green bodies 100g to be extruded, and the ceramic articles 100 to be manufactured, without tears, cracks, unintended dimensional variability, or other defects.

Referring back to the embodiment illustrated in FIG. 3, the first coating 42 is illustrated as having been applied on or over the base material (e.g., stainless steel or other durable material) of the die body 26 before the second coating 44 was applied by the second coating process. For example, as shown in the embodiment of FIG. 3, the second coating 44, due to being applied after the first coating 42, is arranged so that at least a portion of the second coating 44 is overlapping and/or coated on top of at least a portion of the first coating 42. In such embodiments, the second zone 48 transitions to the first zone 46 at an overlap zone 50, in which the thickness of the second coating 44 tapers or decreases in the axial direction toward the inlet face 32 until only the first coating 42 remains. Since the outermost coating in the overlap zone 50 in FIG. 3 is the second coating 44, the overlap zone 50 can be considered as a portion of the second zone 48 in the embodiment of FIG. 3.

In contrast to the embodiment of the overlap zone 50 shown in FIG. 3, the first coating 42 can alternatively be applied so that it is at least partially overlapping and/or on top of at least a portion of the second coating 44, such that the overlap zone 50 instead comprises a tapering or decrease in the thickness of the first coating 42 in the axial direction toward the discharge face 34 until only the second coating 44 remains. In some embodiments, the first coating 42 and the second coating 44 do not overlap (there is no overlap zone 50), with the first and second zones directly abutting each other. However, the presence of the overlap zone 50 may advantageously facilitate ease of manufacture of the extrusion die 16 and/or assist in preventing any gaps or breaks in the coatings 42 and 44 (e.g., thereby preventing exposure of the bare material of the die body 26 to the flow of batch material 15 through the die 16).

One or both of the first coating 42 and the second coating 44 can have a thickness that is variable at different locations along the flow path (variable with respect to the axial location). For example, the coatings 42 and/or 44 can be thickest proximate to one of the faces of the die 16 (have a maximum thickness proximate to the inlet face 32 or the discharge face 34) and thinnest proximate to the opposite face (have a minimum thickness at the opposite face). For example, as shown in FIG. 3, the first coating 42 has a variable thickness that is thickest (has a maximum thickness) proximate to the inlet face 32 and that is thinnest (has a minimum thickness) proximate to the discharge face 34. As shown in FIG. 3, the total thickness of the first and second coatings 42 and 44 on the side surfaces 37 of the pins 38 at the discharge face 43 can be selected to set or define a slot width sw for the slots 30 based on a known or targeted distance between the pins 38 when the pins 38 are bare.

In some embodiments, the first coating process and the second coating process are implemented with respect to opposite axial directions in order to create the first zone 46 and the second zone 48. For example, the first coating 42 can be applied, as indicated by an arrow 52, with respect to a first axial direction oriented from the inlet face 32 toward the discharge face 34, so as to preferentially coat the flow path through the die 16 proximate to the inlet face 32 in comparison to the flow path proximate to the discharge face 34. Similarly, the second coating 44 can be applied, as indicated by an arrow 54, with respect to a second axial direction oriented from the discharge face 34 toward the inlet face 32, so as to preferentially coat the flow path through the die 16 proximate to the discharge face 34 in comparison to the flow path proximate to the inlet face 32.

In some embodiments, the first coating process is a chemical vapor deposition (CVD) or other particle deposition process, in which the reactant gas is flowed toward and through the die 16 in the direction of the arrow 52. In this way, the concentration of deposition material and/or flow rate of the reactant gas is greatest when the flow first encounters the inlet face 32, thereby depositing relatively more material proximate to the inlet face 32 than is deposited proximate to the discharge face 34 where the reactant gas has been at least partially depleted. In some embodiments, an impedance plate (a plate having holes or other restrictions therein to limit or otherwise control the flow rate of reactant gas through the plate) can be inserted between the source of the reactant gas in a CVD process and the die to be coated to control the flow rate to the die, such as taught in U.S. Pat. No. 7,303,782 to Avery et al., the disclosure of which is incorporated by reference herein in its entirety.

By preferentially applying the first coating 42 at the inlet face 32, the thickness of the first coating 42 is variable as described above (thickest at, and decreasing axially from, the inlet face 32). Similarly, in some embodiments, the second coating process is a CVD or other particle deposition process, in which the flow of deposition material is flowed toward and through the die 16 in the direction of the arrow 54, so as to preferentially coat the extrusion die 16 at the discharge face 34, and thereby result in a variable thickness of the second coating 44. In some embodiments, the arrangement of FIG. 3 can be achieved by first applying the first coating 42 in a CVD process, directing the flow of deposition material with respect to the arrow 52, and then applying the second coating 44 in a plating process performed only at the discharge face 34 side of the die 16, as indicated by the arrow 54. For example, the die 16 can be arranged in a CVD chamber with the inlet face 32 oriented facing toward the reactant gas inlet in the first coating process (such that the reactant gas is traveling toward the die in the direction of the arrow 52 in the first coating process), then the die 16 repositioned (flipped around) to orient the discharge face 34 facing toward the reactant gas inlet in the second coating process (such that reactant gas is traveling toward the die in the direction of the arrow 54 in the second coating process).

Alternatively, the arrows 52 and/or 54 can be the directionality used in a plating process. For example, the parameters of the plating process can be set to preferentially coat either end face of the die 16, such as setting the conductivity of the plating bath (if an electrodeposition plating process is used), the unidirectional flow rate of the bath through the die (direction of the arrows 52 and/or 54 during the first and/or second coating processes), and the concentration of coating material in the bath, such that the concentration of the bath is depleted as it travels through the die 16. For example, the inlet face 32, the feedholes 28, and/or the connections 35 can be preferably coated by setting the flow of the bath with respect to the direction of the arrow 52, and/or the end surfaces of the pins 38 at the discharge face 34, the slots 30 (pin side surfaces 37), and/or the connections 35 can be preferentially coated by setting the flow of the bath with respect to the direction of the arrow 54.

In some embodiments, the first coating process comprises multiple coating processes, and the variable thickness of the first coating 42 is achieved by performing each subsequent coating process over an axially shorter length from the inlet face 32, thereby building up the thickness of the first coating 42 to be thickest proximate to the inlet face 32. Similarly, in some embodiments, the second coating process comprises multiple coating processes, and the variable thickness of the second coating 44 is achieved by performing each subsequent coating process over an axially shorter length from the discharge face 34, thereby building up the thickness of the second coating 44 to be thickest proximate to the discharge face 34.

In some embodiments, such as shown in FIG. 3, the first coating 42 coats the entire length of the flow path through the die 16, optionally including the surfaces at the discharge face 34. In some embodiments, the second coating 44 coats the entire length of the flow path through the die 16, optionally including the surfaces at the inlet face 32. In some embodiments, at least a portion of the flow path through the die 16 and/or at least the surface at the discharge face 34 is not coated by the first coating 42. In some embodiments, at least a portion of the flow path through the die 16 and/or at least the surface at the inlet face 32 is not coated by the second coating 44.

In some embodiments the first and/or second coating processes comprise covering one or more surfaces of the die, such as the inlet face 32, the discharge face 34, and/or the feedholes 28 with a removable mask and then removing the removable mask (and any coating material on the mask), thereby preventing the respective coating materials from being applied to the inlet face 32 and/or the discharge face 34. For example, in some embodiments graphite can be used to mask the surfaces of the die 16, such as graphite tubes that are inserted into the feedholes 28 to mask the feedholes 28 from being coated during one of the coating processes.

In some embodiments, a coating stripping or removal process is performed to physically and/or chemically remove the first coating 42 or second coating 44 from one or more locations on the die 16. For example, some or all of the die 16 can be coated with the first coating 42 or the second coating 44, and then that coating is stripped from an area of the die 16, which area is subsequently coated with the other coating.

As described above, the roughness of the material of the second coating 44 can be selected in order to increase the localized flow resistance through at least a portion of the slots 30 proximate to the discharge face 34. Another advantage recognized by the current inventors is that this localized flow resistance proximate to the discharge face 34 can be implemented in order to reduce the axial length of the pins 38 and/or to avoid the need for the creation of complex die features, such as divots or plenums in the side surfaces 37 of the pins 38. That is, features such as divots and plenums are generally known for controlling or affecting the knitting, spreading, and/or flow uniformity of the material through the batch, but require additional fabrication steps, and are not suitable for every type of die.

Additionally, since the flow resistance through the slots 30 is at least partially a function of the length of the pins 38, shorter lengths for the pins 38 can be used to achieve the same flow resistance as longer lengths if the side surfaces 37 of the pins 38 defining the slots 30 are comparatively rougher. Reducing the length of the pins can be useful for both decreasing the total amount of material needed to fabricate the die 16 (the overall axial thickness of the die can be reduced as the length of the pins 38 is reduced), reduce the cost and complexity of fabricating the die 16 by reducing the amount of features that need to be cut or formed in the die (e.g., less cutting/slitting is required as the length of the slots 30, corresponding to the lengths of the pins 38, is decreased), and increasing the dimensional accuracy and/or uniformity of the die 16 over time (e.g., the pins 38 are less prone to splay as the axial length of the pins 30 is reduced).

It has also been found by the current inventors that the increase in localized flow resistance through the slots 30 proximate to the discharge face 34 is particularly advantageous in dies having "asymmetrical" slot/pin patterns. For example, referring back to FIG. 2, the illustrated embodiment of the die 16 comprises a first subset of the pins 38 having a first pin width w1 and a second subset of the pins having a second pin width w2 that is smaller than the first pin width w1. Dies having differently sized pins may be referred to asymmetric dies, as adjacent pins are asymmetrical with respect the slot separating the adjacent pins. Examples of asymmetric honeycomb patterns are described in U.S. Pat. No. 7,601,194 to Beall et al., the disclosure of which is incorporated by reference herein in its entirety.

While honeycomb bodies having such asymmetrical patterns are generally known to be advantageous in the formation of particulate filters (the relatively larger channels when arranged as inlet channels in a particulate filter provide comparatively higher levels of ash/soot storage, as taught in the aforementioned patent incorporated above), the asymmetric nature of the dies required to make these asymmetric honeycomb bodies limits the methodologies capable of fabricating the asymmetric dies (e.g., processes such as wire-slitting cannot be used to make the slots of an asymmetric die since the slots do not extend in straight lines across the face of the die). Furthermore, the asymmetric nature of these dies make the addition of die slot features such as plenums or divots impractical.

Modeling was performed to compare the performance a die partially coated with a NiD coating in comparison to a die completely coated by a TiCN coating. The modeling analysis was performed with respect to an asymmetric die having a "300/7" configuration, i.e., a die arranged to manufacture a honeycomb body having approximately 300 cells (channels) per square inch (cpsi) and a wall thickness of between about 7-8 mils (0.18 mm to 0.20 mm). In the model, the NiD coating was modeled as being applied over the last 0.025 inches of the pins at the discharge face, with the remaining length of the pins coated by the modeled TiCN coating.

The analysis showed that, due to the higher roughness of the NiD coating, approximately the same values (less than 0.5% difference) for both knitting pressure (localized pressure just before the batch mixture was discharged at the discharge face) and overall die pressure (to achieve a target extrusion speed of 0.5 inches per second) was achieved for pins having a length of 0.125 inches when the NiD coating was used in comparison to a pin length of 0.150 inches when the TiCN coating was used. Furthermore, the modeling showed that the flow velocity through the slots at the discharge face was significantly more uniform and less susceptible to variations in localized batch properties (e.g., localized hot or cold spots in the batch) for the NiD coated pins than for the TiCN coated pins.

Figure 7:
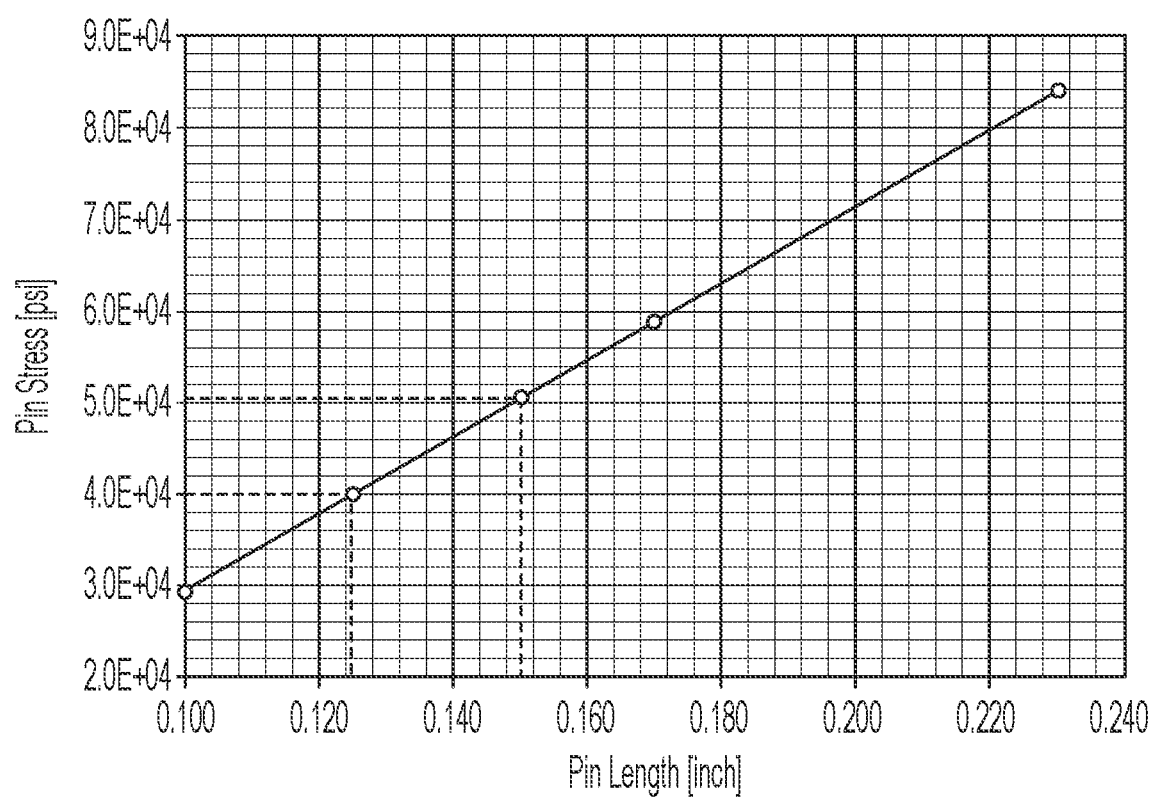
FIG. 7 is a graph showing a relationship between pin stress and pin length for one example die analyzed herein.

FIG. 7 illustrates the linear relationship between the pin root bending stress in pounds per square inch (psi) due to die wash versus the pin length for the aforementioned modeled 300/7 asymmetric die. For example, as shown, reducing the pin length from 0.15" to 0.125" can correspondingly reduce pin bending stress from 50,000 psi to 40,000 psi. While FIG. 6 relates to a specific die geometry ("300/7 configuration") during die wash simulation, the general relationship between pin length and pin stress will hold true for other die configurations and pin dimensions during batch mixture extrusion. Additionally, for those dies with even longer pins, the possible length reduction and corresponding pin stress reduction could be even more significant.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. An extrusion die comprising:
   a plurality of pins comprising side surfaces defining an intersecting array of slots extending axially into the die from a discharge face of the die;
   a plurality of feedholes extending axially into the die from an inlet face of the die opposite to the discharge face, wherein the feedholes connect with the slots at intersections within the die to create a flow path from the inlet face to the discharge face;
   a first coating on at least a portion of the feedholes in a first zone extending over a first axial length of the flow path; and
   a second coating on at least a portion of the side surfaces of the pins in a second zone extending over a second axial length of the flow path,
   wherein the first coating is different than the second coating,
   wherein the first coating is applied over the second coating or directly to a base material of the extrusion die, or both,
   wherein the second coating is applied over the first coating or directly to the base material of the extrusion die, or both,
   wherein at least one of the first coating or the second coating is applied directly to the base material of the extrusion die, and
   wherein the first zone transitions to the second zone at an overlap zone at which the first coating is applied over the second coating and a thickness of the first coating tapers in an axial direction toward the discharge face until only the second coating is present.

2. The extrusion die of claim 1, wherein the second coating has a wear-resistance that is greater than that of the first coating.

3. The extrusion die of claim 1, wherein the second coating has a hardness that is greater than that of the first coating.

4. The extrusion die of claim 1, wherein the second coating has a roughness that is greater than that of the first coating.

5. The extrusion die of claim 1, wherein the second coating comprises particles embedded in a matrix, and wherein the particles have a hardness that is greater than that of the first coating.

6. The extrusion die of claim 1, wherein the first coating comprises at least one of a nickel plating, a titanium nitride (TiN) coating, or a titanium carbonitride (TiCN) coating.

7. The extrusion die of claim 1, wherein the second coating comprises at least one of a particle-embedded nickel plating, a titanium carbonitride (TiCN) coating, or a boron-doped titanium carbonitride coating (B-TiCN).

8. The extrusion die of claim 1, wherein the first zone extends from the inlet face to cover at least a portion of the side surfaces of the pins.

9. The extrusion die of claim 1, wherein the second zone extends from the discharge face to cover at least a portion of the feedholes.

10. An extrusion die comprising:
a plurality of pins comprising side surfaces defining an intersecting array of slots extending axially into the die from a discharge face of the die;
a plurality of feedholes extending axially into the die from an inlet face of the die opposite to the discharge face, wherein the feedholes connect with the slots at intersections within the die to create a flow path from the inlet face to the discharge face;
a first coating on at least a portion of the feedholes in a first zone extending over a first axial length of the flow path; and
a second coating on at least a portion of the side surfaces of the pins in a second zone extending over a second axial length of the flow path,
wherein the first coating is different than the second coating,
wherein the first coating is applied over the second coating or directly to a base material of the extrusion die, or both,
wherein the second coating is applied over the first coating or directly to the base material of the extrusion die, or both,
wherein at least one of the first coating or the second coating is applied directly to the base material of the extrusion die, and
wherein the second zone transitions to the first zone at an overlap zone at which the second coating is applied over the first coating and a thickness of the second coating tapers in an axial direction toward the inlet face until only the first coating is present.

11. An extrusion die comprising:
a plurality of pins comprising side surfaces defining an intersecting array of slots extending axially into the die from a discharge face of the die;
a plurality of feedholes extending axially into the die from an inlet face of the die opposite to the discharge face, wherein the feedholes connect with the slots at intersections within the die to create a flow path from the inlet face to the discharge face;
a first coating on at least a portion of the feedholes in a first zone extending over a first axial length of the flow path; and
a second coating on at least a portion of the side surfaces of the pins in a second zone extending over a second axial length of the flow path,
wherein the first coating is different than the second coating,
wherein the first coating is applied over the second coating or directly to a base material of the extrusion die, or both,
wherein the second coating is applied over the first coating or directly to the base material of the extrusion die, or both,
wherein at least one of the first coating or the second coating is applied directly to the base material of the extrusion die, and
wherein the first coating is applied along an entire length of the flow path from the inlet face to the discharge face, and the second coating is applied over at least a portion of the first coating such that the second zone corresponds to the portion covered by the second coating and the first zone corresponds to a non-covered portion.

12. An extrusion die comprising:
a plurality of pins comprising side surfaces defining an intersecting array of slots extending axially into the die from a discharge face of the die;
a plurality of feedholes extending axially into the die from an inlet face of the die opposite to the discharge face, wherein the feedholes connect with the slots at intersections within the die to create a flow path from the inlet face to the discharge face;
a first coating on at least a portion of the feedholes in a first zone extending over a first axial length of the flow path; and
a second coating on at least a portion of the side surfaces of the pins in a second zone extending over a second axial length of the flow path,
wherein the first coating is different than the second coating,
wherein the first coating is applied over the second coating or directly to a base material of the extrusion die, or both,
wherein the second coating is applied over the first coating or directly to the base material of the extrusion die, or both,
wherein at least one of the first coating or the second coating is applied directly to the base material of the extrusion die, and
wherein the second coating is applied along an entire length of the flow path from the inlet face to the discharge face, and the first coating is applied over at least a portion of the second coating such that the first zone corresponds to the portion covered by the first coating and the second zone corresponds to a non-covered portion.

13. The extrusion die of claim 12, wherein the die comprises a plurality of separately coated components affixed together.

14. The extrusion die of claim 12, wherein the die comprises an inlet plate comprising at least an inlet portion of the feedholes that is coated by the first coating and a discharge plate comprising at least a downstream portion of the slots and the pins that is coated by the second coating.

* * * * *